United States Patent [19]

Zhang et al.

[11] Patent Number: 5,990,446
[45] Date of Patent: Nov. 23, 1999

[54] METHOD OF ARC WELDING USING DUAL SERIAL OPPOSED TORCHES

[75] Inventors: Yuming Zhang; Shaobin Zhang, both of Lexington, Ky.

[73] Assignee: University of Kentucky Research Founadtion, Lexington, Ky.

[21] Appl. No.: 09/049,191

[22] Filed: Mar. 27, 1998

[51] Int. Cl.$^6$ .................................................. B23K 10/02
[52] U.S. Cl. ................ 219/137 PS; 219/75; 219/121.45; 219/121.46
[58] Field of Search ........................... 219/137 PS, 124.1, 219/125.1, 136, 137 R, 60 R, 61, 75, 121.45, 121.46

[56] References Cited

U.S. PATENT DOCUMENTS

| | | | |
|---|---|---|---|
| 2,716,691 | 8/1955 | Bowman | 219/60 R |
| 2,764,668 | 9/1956 | Dumoulin | 219/137 PS |
| 3,114,829 | 12/1963 | Libby | 219/125.1 |
| 3,248,513 | 4/1966 | Sunnen . | |
| 3,319,043 | 5/1967 | Rohrberg | 219/137 R |
| 3,437,787 | 4/1969 | Chyle | 219/125.1 |
| 3,475,587 | 10/1969 | Budds et al. | 219/137 PS |
| 3,588,660 | 6/1971 | Purkhiser | 219/124.1 |
| 4,023,006 | 5/1977 | West et al. . | |
| 4,153,831 | 5/1979 | Renzulli et al. . | |
| 4,439,662 | 3/1984 | Tateno . | |
| 5,045,667 | 9/1991 | Iceland et al. . | |
| 5,225,654 | 7/1993 | Harwig et al. . | |
| 5,347,098 | 9/1994 | Murakami et al. . | |
| 5,388,753 | 2/1995 | Bjorkman, Jr. . | |
| 5,599,469 | 2/1997 | Yoshino . | |
| 5,614,110 | 3/1997 | Shintani et al. . | |

OTHER PUBLICATIONS

Craig; The Plasma Arc Process—A Review; Welding Journal; Feb. 1988; 19–25.

*Primary Examiner*—Clifford C. Shaw
*Attorney, Agent, or Firm*—King and Schickli

[57] ABSTRACT

An improved method of arc welding uses a single power supply connected to opposed welding torches placed on both sides of a workpiece. Each torch is connected to a different polarity lead of the power supply and forms a separate arc with the workpiece. When a current is supplied to the first torch, it is guided from the first electrode, through the first arc, the workpiece, the second arc, and to the electrode of the second torch. This guiding function improves the penetration, concentration, as well as the directional stability of the arc. This permits the effective and efficient welding of relatively thick workpieces using existing equipment at low current levels.

17 Claims, 4 Drawing Sheets

METHOD OF ARC WELDING USING DUAL SERIAL OPPOSED TORCHES

TECHNICAL FIELD

The present invention relates generally to the field of metal joining and, more particularly, to a method of arc welding using opposed torches, in series, for guiding the welding current through the workpiece(s), thereby improving arc penetration and concentration.

BACKGROUND OF THE INVENTION

The joining of metal components plays a critical role in modern manufacturing and industrial processes. Of the different forms of metal joining, arc welding is widely used to produce a variety of high quality bonds. This is because for many applications, arc welding has proven to be the most cost effective manner of metal joining. However, conventional methods of arc welding suffer from several drawbacks, the most prevalent of which is the inability to penetrate relatively thick workpieces. As a result, such thick workpieces often require multiple passes, which increases welding time, and/or beveling of the edges of the weld seam, which increases preparation time.

Of course, improving penetration reduces the number of passes and the workpiece preparation costs, both of which are important in increasing manufacturing efficiency. In this regard, gas tungsten arc welding (GTAW) (also commonly referred to as tungsten-inert gas (TIG) welding) and the related plasma arc welding (PAW) have gained widespread acceptance as providing greater arc penetration than conventional arc welding methods.

In conventional gas tungsten arc welding, a current is supplied to a non-consumable tungsten or tungsten alloy electrode to form an arc with a workpiece. A special nozzle provides a gas to shield the arc and the weld pool from contamination. The weld bead may be purely autogenous or a filler metal compatible with the base metal may be added, depending on the requirements of the particular operation. While GTAW results in quality welds, like conventional arc welding, the unconstricted arc prevents deep penetration due to the current dissipation.

Plasma arc welding involves the use of a non-consumable electrode which may also be comprised of tungsten or tungsten alloys. However, in addition to a shielding gas, a specialized PAW nozzle is provided which feeds a plasma gas into a chamber surrounding the electrode. Current supplied to the electrode forms an arc with the workpiece(s) adjacent to the weld seam. Heat created by the electric arc ionizes the plasma gas to form electrically conductive plasma, which issues forth from the narrow orifice in the nozzle and carries the arc to the workpiece. This narrow orifice constricts the flow of the plasma gas towards the workpiece into a plasma jet. The arc and plasma jet, collectively referred to as the "plasma arc," generally reach temperatures in excess of 30,000° F. As should be appreciated, the combined constricted arc and high temperature serve to provide greater penetration of the workpiece(s), improved directional stability, and a smaller heat-affected zone than possible with GTAW and other arc welding processes.

In operation, as the PAW torch traverses the weld seam, the heat of the plasma arc melts the base metal and forms an autogenous weld pool. Depending on the thickness of the workpiece(s) being joined and the welding parameters utilized (i.e. the selected arc voltage and current), the extension of the plasma arc may create a small hole extending entirely through the workpiece(s). This hole is termed the "keyhole" and is known to provide several beneficial characteristics, such as reducing porosity and transverse distortion in the bead. As the torch travels along the surface of the workpiece(s) above the weld seam, the keyhole is continuously created and filled. More specifically, the base metal melts upon encountering the plasma arc or the plasma jet and flows from the front of the arc, to the sides, and around to the rear where solidification occurs. Of course, the solidified metal forms the weld bead which is essential to the metal joining operation.

PAW generally provides the deepest penetration of all known arc welding methods, but even with the improved characteristics described above, limitations remain. Even with the constricted arc provided by the PAW torch and the benefits provided by the unique keyhole, proper welding of thicker workpieces remains a problem. More particularly, it is known that during the PAW process, the current required to form the arc generally disperses laterally along the surface of the workpiece(s). As a result of this dispersion, the arc does not extend into the keyhole due to the absence of current. The plasma arc, which is actually the plasma gas jet once it is ionized and heated by the arc, becomes the major heat flux that directly heats the base metal around the keyhole, rather than the arc. However, the plasma jet loses energy as it penetrates into the workpiece, which decreases its penetration capability. This may prevent the keyhole from extending entirely through the workpiece. Furthermore, increasing the current simply increases the weld width and the heat affected zone and, thus, does not significantly improve penetration.

Conventional solutions to overcome these limitations include: (1) machining beveled grooves in the weld seam prior to PAW; or (2) conducting multiple passes with the PAW torch. While both alternatives provide deeper weld penetration, it should be appreciated both require significant additional expense and increase fabrication time. These are factors which are critical in evaluating the comparative efficiency of modern manufacturing processes.

Other non-arc type alternatives for welding thicker workpiece(s) include laser beam and electron welding. These methods permit deeper penetration than both GTAW and PAW. However, the complexity and significant cost of the equipment required renders each method impractical for implementation in many manufacturing applications or for small operations.

Accordingly, a need is identified for an improved method of arc welding for increasing the current penetration through the workpieces, thereby allowing high quality welds to be formed in or on relatively thick workpieces at low current levels. The method would utilize existing welding equipment and, thus, would be inexpensive to operate, as compared to modern types of deep penetration welding, such as laser beam or electron welding. Moreover, the method would be easy to implement and adapt to a wide variety of welding environments.

SUMMARY OF THE INVENTION

Keeping the foregoing needs in mind, it is a primary object of the present invention to provide an improved method of arc welding that permits the efficient and effective joining of relatively thick workpieces at low current levels.

Another object of the present invention is to provide a more cost effective method of arc welding that improves the penetration and concentration of the arc by using dual opposed welding torches including at least one plasma arc welding torch that produce an arc on both sides of the weld seam formed on or between one or more adjoining workpieces.

Still another object of the present invention is to provide a method of arc welding that produces high quality welds in thick workpieces and is easy and relatively inexpensive to implement using existing welding equipment.

Yet another object of the present invention is to provide a new and improved welding system for performing the present method of welding and achieving its attendant benefits.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method of arc welding with dual opposed torches is provided. In the broadest aspects of the invention, the method includes the steps of placing a first welding torch having a selected polarity at one side of a workpiece, placing a second welding torch having an opposite polarity at the opposite side, and providing an electric current to form an arc between each torch and the respective side of the workpiece. The term workpiece refers to one or more sections of material either being welded on or joined together. Advantageously, the presence of the dual opposed torches having opposite polarities and producing separate arcs serves to draw the current from the first welding torch, through the workpiece, and to the second welding torch, thereby concentrating the current and ensuring that the plasma arc thoroughly penetrates the workpiece.

In the preferred embodiment, the first torch is a plasma arc welding (PAW) torch and the second torch is a gas tungsten arc welding (GTAW) torch, forms of both torches being well known in the art. The PAW torch is connected to a single power supply lead having a selected polarity and is placed at a selected torch standoff distance at one side of the workpiece. The second torch is placed on the opposite side of the workpiece substantially in-line with the first torch, but on the opposite side of the workpiece.

In operation, a current is supplied to the electrode of the PAW torch to form an arc. Simultaneously, a constant supply of plasma gas at a pre-determined flow rate is provided to a plenum chamber formed around the electrode tip. The arc serves to ionize the plasma gas, which then issues from a narrow orifice in the torch nozzle, thereby forming an electrically conductive plasma jet which carries the arc, collectively referred to as the "plasma arc". The gas component of the plasma arc serves to carry and partially shield the electric arc as it travels to the workpiece.

Upon contacting the workpiece, the plasma arc melts the base metal and forms a weld pool. As noted above, for the proper workpiece thickness and welding parameters, the plasma arc is sufficiently strong to form a keyhole extending entirely through the workpiece. This ensures deep weld penetration and the formation of a high quality weld bead. However, for still thicker workpieces, the plasma jet deionizes and, thus, is prevented from reaching through the workpiece and forming the desired keyhole. This is due to the inability of current to extend through the workpiece.

In order to provide significantly greater arc penetration and thereby produce the desired high quality welds in thicker workpieces, the present method includes the step of placing a GTAW torch on the opposite side of the weld seam substantially in-line with the PAW torch. The GTAW torch is connected to the opposite lead of the power supply such that it has a different polarity than the PAW torch. Despite the inability of the plasma jet alone to penetrate and form a keyhole in thicker workpieces at lower current levels, all current is now drawn from the PAW electrode, through the first arc, directly through the workpiece, through the second arc, and to the GTAW torch.

Thus, the current is directed through the workpieces, rather than simply dispersing laterally along the surface upon contact, as is characteristic of prior art PAW methods. This advantageously serves to further concentrate the arc and ensure plasma jet penetration, even where relatively thick workpieces (e.g. up to and including three-eighths of an inch) are presented and at lower current levels than previously possible. Moreover, the method utilizes existing welding equipment, thereby avoiding the significant expense associated with other forms of deep penetration welding, such as laser beam or electron welding. Additionally, no substantial pre-welding workpiece preparation is required and multiple passes are unnecessary, thereby improving productivity and lowering production costs.

It should be appreciated that in addition to the system described above, other alternate systems are capable of producing high quality welds in thick workpieces at low currents using the above-described principles. For example, the PAW torch and GTAW torch may be alternated, such that one is above the workpieces and the other is below, or visa versa. When the PAW torch is placed below the workpiece, the pressure of the plasma arc forces the molten weld pool in an upward fashion, thereby preventing the deleterious undercut that sometimes forms when the plasma arc is in the downward position. The use of other combinations of welding torches for use on different base metals is also contemplated (e.g. consumable electrode/PAW, GTAW/GTAW, consumable/GTAW, PAW/PAW, and others).

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrate several aspects of the present invention and, together with the description, serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
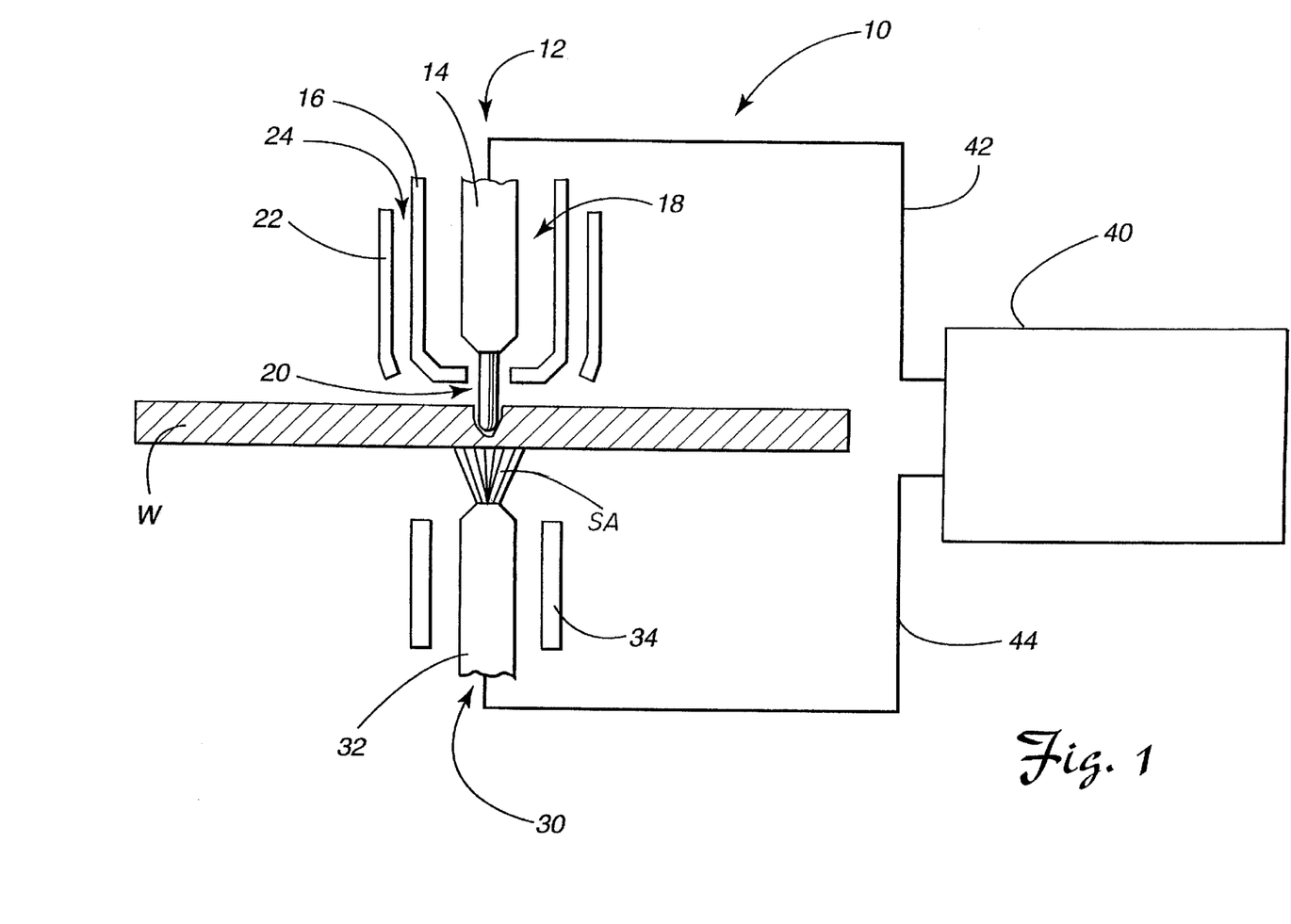
FIG. 1 is a diagram showing a preferred embodiment for performing the method of the present invention, with a plasma arc welding torch placed above the workpieces and a gas tungsten arc welding torch below the workpieces, the workpieces being in a flat position.

Reference is now made to FIG. 1, showing a preferred embodiment of a system 10 used to perform the improved arc welding method of the present invention. The method includes the step of placing a first welding torch at a selected first side of the workpiece W. For demonstration purposes, the workpiece is shown a single piece of metal held in the flat position. However, it should be appreciated the workpiece may encompass one or more pieces of metal being joined together in any position.

In the preferred embodiment, the first torch is a plasma arc welding (PAW) torch 12 of a type known in the art and preferably includes a non-consumable electrode 14 surrounded by an inner constricting nozzle 16 forming a plenum chamber 18 for supplying the plasma gas. A narrow orifice 20 is formed in the tip of the constricting nozzle 16 which allows the plasma arc PA to form between the PAW electrode 14 and the workpiece W, as described further below. An outer nozzle 22 formed around the inner nozzle 16 provides a shielding gas chamber 24 for supplying a gas for protecting the arc and the weld pool from contamination by the surrounding atmosphere.

A second torch is placed on the opposite side of the workpiece W such that it is substantially in line with the PAW torch 12. Preferably, a gas tungsten arc welding (GTAW) torch 30 of a type known in the art is used as the second torch. However, the use of other combinations of arc welding torches and arrangements is also contemplated, as is discussed further below.

As can be appreciated from viewing FIG. 1, in the preferred embodiment, the PAW torch 12 is placed above the workpiece and the GTAW torch 30 below the workpiece W. However, as will be understood after reviewing the disclosure herein, the opposite arrangement may also be utilized to avoid the undercutting that sometimes occurs in the welding of some metals due to the high pressure created by PAW torch when used in the downward position (see FIG. 1a).

The preferred GTAW torch includes a tungsten electrode 32 surrounded by a shielding gas nozzle 34. In addition to the absence of the plasma jet, the primary difference between the GTAW torch 30 and the PAW torch 12 is the degree of the electrode extension. More specifically, because the GTAW second arc SA is not constricted and carried by a plasma jet, GTAW requires that the electrode 32 remain closer to the workpiece W to provide a stable and directionally controlled arc.

Upon aligning the dual opposed welding torches 12, 30, the step of supplying a current to the PAW torch 12 follows. More particularly, a power supply 40 having opposite polarity leads 42, 44 (i.e. positive and negative leads) is provided. Each of the leads are connected to the PAW 14 and GTAW 32 electrodes, respectively to form the electrical welding circuit. It should be appreciated that the leads may be interchanged as necessary to vary the heat input to the workpiece. Preferably, the current supplied to the electrodes is pulsed to reduce the heat input to the system 10. Specifically, the current includes a waveform that provides a direct current electrode negative duration (DCEN) followed by a direct current electrode positive duration (DCEP).

The inner constricting nozzle 16 of the PAW torch is then supplied with a plasma gas and the outer nozzle 22 with the shielding gas. The arc ionizes the plasma gas to form the plasma arc PA between the PAW electrode 14 and the workpiece W. This plasma arc PA serves to melt the base metal of the workpiece W and form the weld pool. The shielding gas serves to protect the weld pool from contamination by the surrounding atmosphere.

As mentioned above, during state-of-the-art PAW, the current of the plasma arc PA normally disperses along the surface of the workpiece W, rather than penetrating to extend the plasma jet into the workpiece to form the keyhole. To overcome this dispersion, the prior art teaches increasing the current to improve penetration. However, it should now be appreciated that by using the present method, the current is drawn through the workpiece W and to the electrode 32 of the GTAW torch 30. This flow-through of current causes a second arc SA to form between the GTAW torch and the workpiece W. The second arc SA ensures that the current penetrates the workpiece W, thereby serving to further constrict, or concentrate, the plasma arc PA and ensure that the workpiece is fully penetrated. This concentrated arc also forms a smaller heat-affected zone while providing greater directional stability than is characteristic of prior art arc welding methods. By drawing the current through the workpiece W and further constricting the plasma arc PA, the second arc SA ensures that a high quality weld is formed in a thicker workpiece without increasing the welding current. As set forth below, experiments conducted using the above-described set-up establish the relatively greater workpiece penetration at lower current levels.

EXAMPLE 1

Figure 1A:
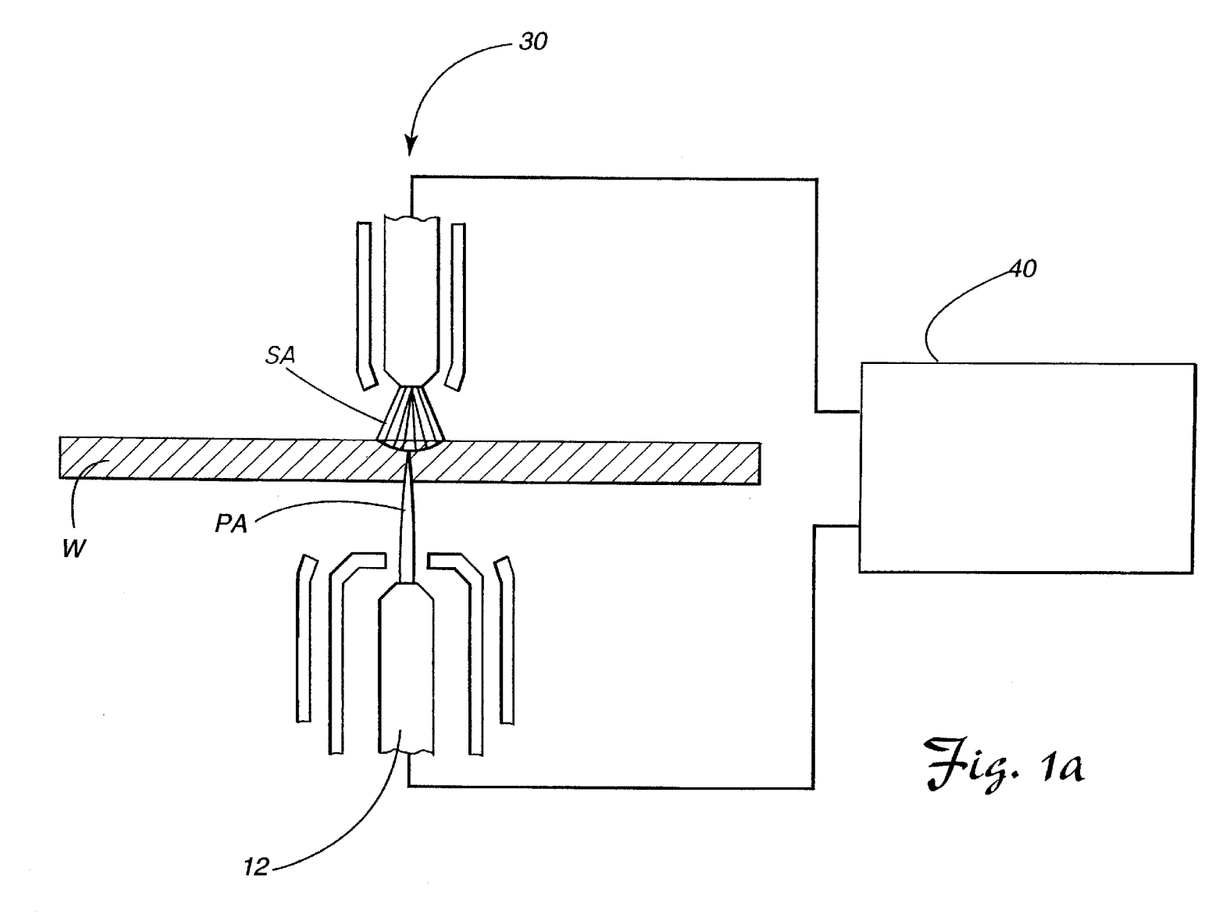
FIG. 1a is a diagram showing an alternate embodiment of a system for practicing the method of the present invention, including switching relative position of the PAW/GTAW torches, which was used to confirm the effectiveness of the present method and to perform the experiments disclosed herein.

Referring now to FIG. 1a, the experimental set-up is such that the PAW torch is below the workpiece and the GTAW torch is above the workpiece. The system for performing the method of the present invention is referred to as double-sided arc welding for convenience (DSAW). The comparative experiment is conducted using a single PAW torch in the downward position connected to a variable polarity power supply, a well-known and popular prior art welding approach. The comparative system is referred to as variable polarity plasma arc welding (VPPAW) for convenience.

The workpiece is 5052 Aluminum held in a substantially flat position having a thickness of 6.5 millimeters. However, it should be appreciated that the method of the present invention is capable of providing the increased penetration on a variety of base metals held in any position.

Pure argon is used as both the shielding gas and the plasma gas for the PAW torch used in DSAW. The flow rate of the plasma gas is 2.6 standard cubic feet per hour (scfh) and the orifice diameter of the inner constricting nozzle is 2.57 millimeters. For the GTAW torch used in DSAW, the shielding gas is argon having a flow rate of 20 scfh. The flow rate of the shielding gas for the single VPPAW torch is 30 scfh. A pulsed current is provided to each electrode having alternating positive durations of 15 milliseconds and negative durations of 15 milliseconds.

For the first experiment, the aluminum plate has a thickness of 6.5 millimeters. The average current is 95 amperes and the arc voltage is 47 volts. For the regular, variable polarity plasma arc welding (VPPAW) process, the average current is 100 amperes and the arc voltage is 30 volts. It should be appreciated that the arc voltage is higher for the present method due to the presence of the second arc. The chosen welding speed for DSAW is 4.7 millimeters per second, while the welding speed is 1.1 millimeters per second for the VPPAW operation.

Using these parameters, it was determined that the workpiece was well-penetrated using the DSAW method and the weld fully formed. However, the VPPAW method produced only a 37 percent penetration into the identical workpiece. Thus, the DSAW method advantageously achieved a significantly greater weld penetration at a greater speed and at a lower current level than standard VPPAW.

EXAMPLE 2

For this example, the workpiece thickness is increased to 9.5 millimeters. For this thickness, DSAW achieved full penetration at a welding speed of 2.7 mm/s and a current of 110 amperes. However, previous experiments show that the VPPAW process utilizing the above-reference parameters requires a slower speed of 2.5 millimeters per second and a significantly higher current of 220 amperes to produce the same degree of penetration. Thus, the DSAW process produces full penetration at a higher speed and significantly lower current/energy input level.

Thus, as demonstrated above, the use of the preferred combined PAW torch and GTAW torch serves to concentrate the arc and improve penetration, no matter whether the PAW torch is above the workpiece and the GTAW below, or visa versa. However, it should be appreciated that it is possible to substitute different combinations of torches for use with different welding conditions, such as different base metals.

Figure 2:
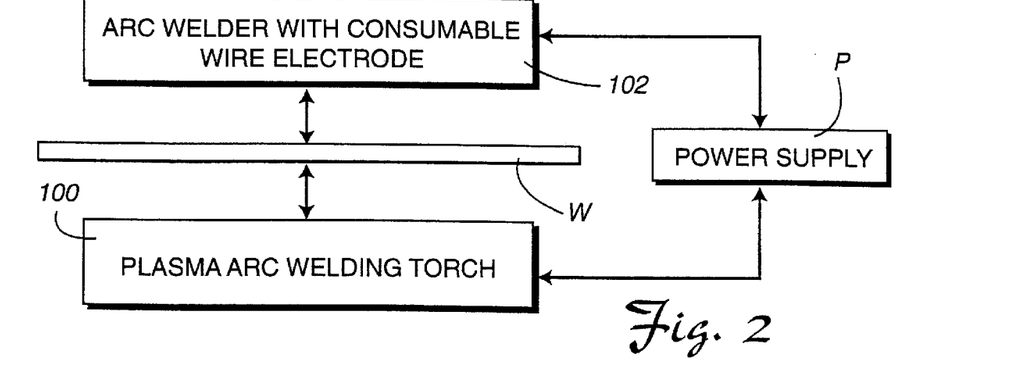
FIG. 2 is a block diagram showing an alternate embodiment of a system utilizing a consumable wire electrode and a PAW torch in combination for practicing the method of the present invention.

One such alternate embodiment for performing the present improved welding method using dual opposed arcs is shown in FIG. 2. The PAW torch 100 is placed below the workpiece W, which for purposes of illustration only is shown in the flat position. However, instead of placing a GTAW torch above the workpiece, an arc welding "torch" 102 is provided. Use of the term "torch" generally refers to any type of arc welder known in the art, including a simple consumable electrode wire connected to a wire feed controller. Preferably, the positive lead from the power supply P is connected to the consumable electrode and the negative lead to the PAW electrode. In addition to drawing the current through the workpiece W, the flow of current from the positive electrode to the consumable negative electrode in this electrical welding circuit serves to continuously melt the latter, thereby providing a filler metal for producing the topside of the weld bead.

Figure 3:
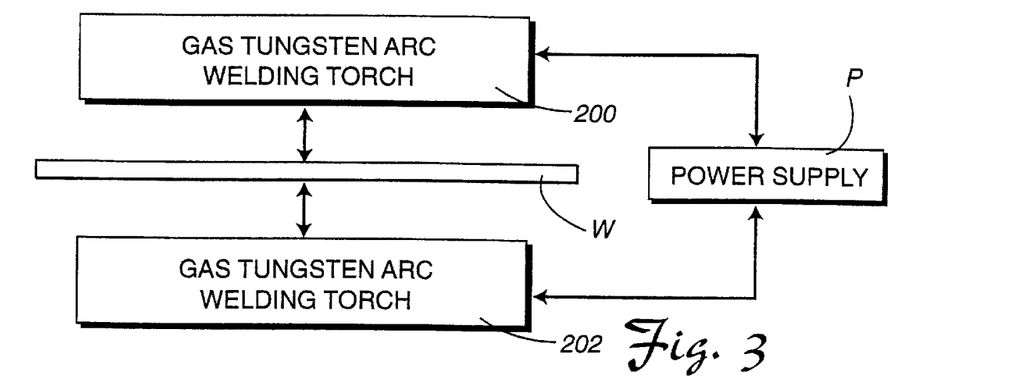
FIG. 3 is a block diagram showing another alternate embodiment of a system utilizing two GTAW torches in combination for practicing the method of the present invention.
Figure 4:
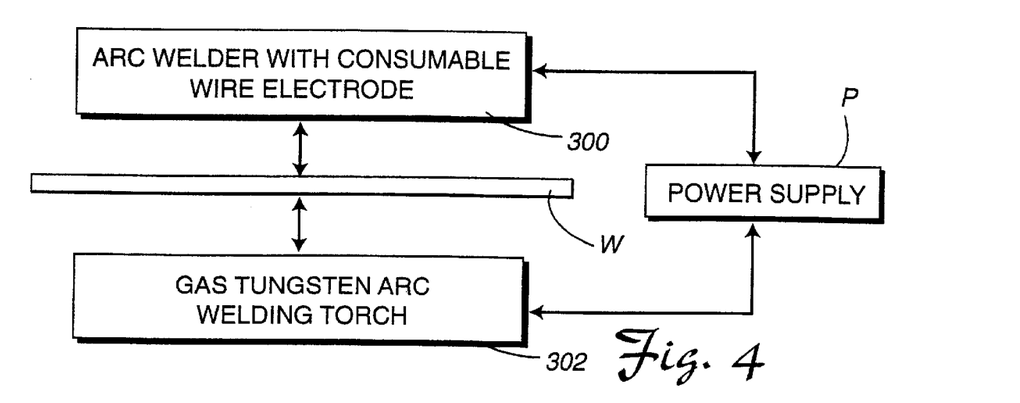
FIG. 4 is a block diagram showing yet another alternate embodiment of a system utilizing a consumable wire electrode and a GTAW torch in combination for practicing the method of the present invention.
Figure 5:
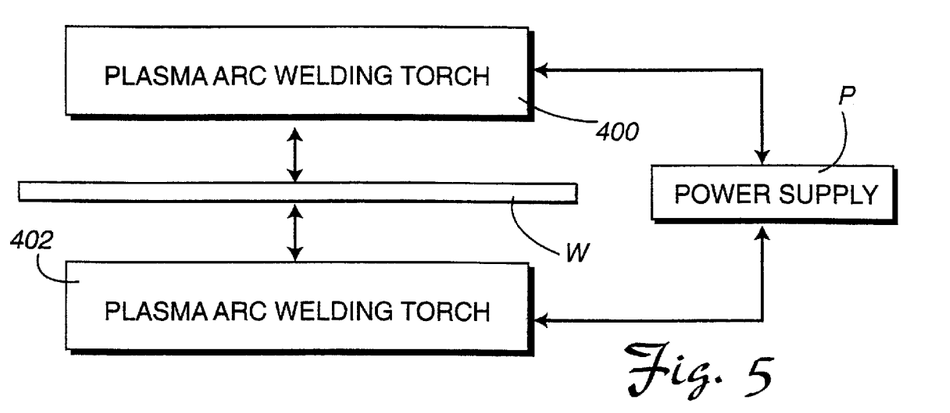
FIG. 5 is a block diagram showing still another alternate embodiment of a system utilizing two opposed PAW torches in combination for practicing the method of the present invention.

Alternatively, as shown in FIGS. 3, 4, and 5, any different types of welders of welding torches may be used to perform the method of the present invention. For example, as shown in FIG. 3, two GTAW torches 200, 202 may be placed on either side of the workpiece. This set-up is of particular benefit in the welding of aluminum or other heat-sensitive materials, as it reduces the heat input to the workpiece, while maintaining an increased arc penetration. As shown in FIG. 4, the system may also be altered such that one of the torches is a arc welding set-up with a consumable electrode wire 300, and the other is a GTAW torch 302 each connected to the power supply P. Finally, as shown in FIG. 5, two opposed PAW torches 400, 402 each connected to a single power supply P may be used as the welding system to perform the improved method of arc welding of the present invention.

In summary, an improved method of arc welding is provided for increasing arc penetration. The method uses a single power supply connected to opposed welding torches placed on both sides of the workpiece. Each torch is connected to a different polarity lead of the power supply and each torch establishes a separate arc between the electrode and the workpiece. When a current is supplied to the first torch, it is guided through the first arc, the workpiece, the second arc on the opposite side of the workpiece, and to the second torch. This guiding function improves the penetration and directional stability of the arc, thereby permitting the effective and efficient welding of relatively thick workpieces using existing equipment at lower current levels.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of arc welding a workpiece using a single power supply having opposite polarity leads, comprising the steps of:

placing a plasma arc welding torch having a selected polarity at a first side of the workpiece;

placing a second welding torch having an opposite polarity at an opposite side of the workpiece in substantial alignment with the plasma arc welding torch; and supplying a current to the plasma arc welding torch for forming a plasma arc for penetrating into the workpiece, said plasma arc creating a keyhole that extends at least partially into the workpiece;

said second welding torch forming a second arc on the opposite side of the workpiece which serves to draw the current and hence the plasma arc into the keyhole to improve penetration of the workpiece.

2. The method of arc welding according to claim 1, wherein said second torch is a gas tungsten arc welding torch.

3. The method of arc welding according to claim 2, including placing the plasma arc welding torch above the workpiece and the gas tungsten arc welding torch below the workpiece.

4. The method of arc welding according to claim 2, including placing the plasma arc welding torch below the workpiece and the gas tungsten arc welding torch above the workpiece.

5. The method of arc welding according to claim 2, wherein the step of supplying a current further includes supplying a plasma gas adjacent to the electrode of the plasma arc welding torch.

6. The method of arc welding according to claim 5, wherein the step of supplying a current further includes supplying a shielding gas to shield the plasm arc.

7. The method of arc welding according to claim 1, wherein the second torch is a arc welder having a consumable wire electrode being fed towards the workpiece.

8. The method of arc welding according to claim 1, wherein the second torch is a plasma arc welding torch.

9. A method of arc welding a workpiece using a single power supply having opposite polarity leads, comprising the steps of:

placing a plasma arc welding torch with a selected polarity at a first side of the workpiece;

placing a gas tungsten welding torch with an opposite polarity at an opposite side of the workpiece in substantial alignment with the plasma arc welding torch;

supplying a current, a plasma gas, and a shielding gas to the plasma arc welding torch, the current establishing an arc for ionizing the plasma gas for forming a plasma jet for carrying the arc and melting a keyhole in the workpiece; and supplying a shielding gas to the gas tungsten arc welding torch;

whereby the second torch forms a second arc for guiding the current into the keyhole.

10. The method of welding according to claim 9, wherein the plasma arc welding torch includes a non-consumable electrode, whereby the arc extends between the electrode and the first side of the workpiece.

11. The method of welding according to claim 9, wherein the gas tungsten arc welding torch includes a non-consumable electrode, whereby the second arc forms between the electrode and the opposite side of the workpiece.

12. An apparatus for welding a workpiece using a single power supply having a pair of opposite polarity leads, comprising:

a plasma arc welding torch having a first electrode connected to a first of the polarity leads of the power supply, said plasma arc welding torch forming a plasma arc for penetrating the workpiece, said plasma arc creating a keyhole that extends at least partially through the workpiece;

a second welding torch having a second electrode connected to a second of the polarity leads of the power supply, said second welding torch forming a second arc between said second electrode and the workpiece;

said first and second electrodes being substantially aligned on opposite sides of the workpiece to draw said plasma arc into said at least partial keyhole to improve penetration of said plasma arc into said workpiece.

13. The apparatus according to claim 12, wherein the second welding torch is a gas tungsten arc welding torch having a non-consumable electrode.

14. The apparatus of claim 12, wherein the second torch is an arc welder having a consumable wire electrode being fed towards the workpiece.

15. The apparatus of claim 12, wherein the second torch is a plasma arc welding torch having a non-consumable electrode, said plasma welding torch including a nozzle having an inner chamber for supplying a plasma gas adjacent to the electrode of the plasma arc welding torch and an outer chamber for supplying a shielding gas adjacent to the second arc and the workpiece.

16. The apparatus of claim 12, wherein the second torch is a gas tungsten arc welding torch having a non-consumable electrode, said gas tungsten arc welding torch further including a chamber for supplying a shielding gas adjacent to the second arc and the workpiece.

17. An apparatus for welding a workpiece, comprising:

a plasma arc welding torch having a first electrode, said plasma arc welding torch generating a plasma arc between the first electrode and the workpiece for penetrating the workpiece and creating a keyhole that extends at least partially into the workpiece;

a second welding torch having a second electrode, said first and second electrodes being substantially aligned on opposite sides of the workpiece, said second welding torch generating a second arc between said second electrode and the workpiece;

a power supply to provide both said plasma arc and second welding torches with current to generate said plasma and second arcs; and an electrical welding circuit for connecting said power supply to said first and second electrodes to provide said first electrode with a first polarity and said second electrode with a second, opposite polarity, whereby said second arc serves to draw current from said plasma arc into said at least partial keyhole to improve the penetration of the workpiece.

* * * * *

UNITED STATES PATENT AND TRADEMARK OFFICE
CERTIFICATE OF CORRECTION

PATENT NO. : 5,990,446
DATED : November 23, 1999
INVENTOR(S) : YuMing Zhang et al.

It is certified that error appears in the above-identified patent and that said Letters Patent is hereby corrected as shown below:

On title page, item 73 Assignee
  replace "Founadtion"
  with --Foundation--.

Col. 9, line 7
  replace "plasm"
  with --plasma--.

Signed and Sealed this

Twenty-third Day of May, 2000

Attest:

Q. TODD DICKINSON

*Attesting Officer*          *Director of Patents and Trademarks*